US009500083B2

(12) United States Patent
Cairo et al.

(10) Patent No.: US 9,500,083 B2
(45) Date of Patent: Nov. 22, 2016

(54) APPARATUS AND METHOD TO REDUCE WEAR AND FRICTION BETWEEN CMC-TO-METAL ATTACHMENT AND INTERFACE

(71) Applicant: GENERAL ELECTRIC COMPANY, Schenectady, NY (US)

(72) Inventors: Ronald Ralph Cairo, Simpsonville, SC (US); Jason Robert Parolini, Greer, SC (US); John McConnell Delvaux, Fountain Inn, SC (US)

(73) Assignee: U.S. Department of Energy, Washington, DC (US)

( * ) Notice: Subject to any disclaimer, the term of this patent is extended or adjusted under 35 U.S.C. 154(b) by 672 days.

(21) Appl. No.: 13/685,230

(22) Filed: Nov. 26, 2012

(65) Prior Publication Data

US 2014/0234117 A1 Aug. 21, 2014

(51) Int. Cl.
*F01D 5/14* (2006.01)
*C04B 35/117* (2006.01)
(Continued)

(52) U.S. Cl.
CPC ............... *F01D 5/14* (2013.01); *C04B 35/117* (2013.01); *C04B 35/185* (2013.01); *C04B 35/565* (2013.01); *C04B 35/803* (2013.01); *C04B 35/806* (2013.01); *C04B 35/83* (2013.01); *C04B 37/026* (2013.01); *F01D 5/3084* (2013.01); *F01D 5/3092* (2013.01); *F23R 3/007* (2013.01); *F23R 3/60* (2013.01); *C04B 2235/5224* (2013.01); *C04B 2235/5228* (2013.01); *C04B 2235/5244* (2013.01); *C04B 2235/5248* (2013.01); *C04B 2235/963* (2013.01); *C04B 2237/123* (2013.01); *C04B 2237/365* (2013.01); *C04B 2237/38* (2013.01); *C04B 2237/405* (2013.01); *C04B 2237/592* (2013.01); *C04B 2237/64* (2013.01); *C04B 2237/66* (2013.01); *C04B 2237/708* (2013.01); *C04B 2237/76* (2013.01); *C04B 2237/84* (2013.01);
(Continued)

(58) Field of Classification Search
None
See application file for complete search history.

(56) References Cited

U.S. PATENT DOCUMENTS 3,317,988 A * 5/1967 Endres .................. B23P 15/006 29/447
4,417,854 A 11/1983 Cain et al.
(Continued)

FOREIGN PATENT DOCUMENTS

EP 0331516 A1 9/1989
EP 0352476 A2 1/1990
(Continued)

OTHER PUBLICATIONS

Search Report and Written Opinion from corresponding PCT Application No. PCT/US2013/058873 dated Oct. 31, 2013.

*Primary Examiner* — Igor Kershteyn
*Assistant Examiner* — Justin Seabe
(74) *Attorney, Agent, or Firm* — McNees Wallace & Nurick LLC

(57) ABSTRACT

An apparatus to reduce wear and friction between CMC-to-metal attachment and interface, including a metal layer configured for insertion between a surface interface between a CMC component and a metal component. The surface interface of the metal layer is compliant relative to asperities of the surface interface of the CMC component. A coefficient of friction between the surface interface of the CMC component and the metal component is about 1.0 or less at an operating temperature between about 300° C. to about 325° C. and a limiting temperature of the metal component.

15 Claims, 4 Drawing Sheets

10 16 26 70 38 42 32 52 36 44 40 40 74 46 50 48 18 30

(51) Int. Cl.

| | |
|---|---|
| ***C04B 35/185*** | (2006.01) |
| ***C04B 35/565*** | (2006.01) |
| ***C04B 35/80*** | (2006.01) |
| ***C04B 35/83*** | (2006.01) |
| ***C04B 37/02*** | (2006.01) |
| ***F01D 5/30*** | (2006.01) |
| ***F23R 3/00*** | (2006.01) |
| ***F23R 3/60*** | (2006.01) |

(52) U.S. Cl.

CPC .................. *F05D2300/6033* (2013.01); *F23R 2900/00017* (2013.01); *Y10T 29/49336* (2015.01)

(56) References Cited

U.S. PATENT DOCUMENTS

| | | | | |
|---|---|---|---|---|
| 5,240,375 | A * | 8/1993 | Wayte | 416/219 R |
| 5,405,660 | A | 4/1995 | Psiuk et al. | |
| 5,466,979 | A | 11/1995 | Bryant et al. | |
| 6,129,967 | A | 10/2000 | Young et al. | |
| 6,132,175 | A | 10/2000 | Cai et al. | |
| 6,398,499 | B1 * | 6/2002 | Simonetti | F01D 5/28 416/193 A |
| 6,860,722 | B2 * | 3/2005 | Forrester | F01D 5/3092 416/193 A |
| 7,329,101 | B2 * | 2/2008 | Carper et al. | 416/219 R |
| 2008/0298976 | A1 | 12/2008 | Kriegl | |
| 2010/0063589 | A1 | 3/2010 | Tepic | |
| 2010/0284816 | A1 | 11/2010 | Propheter-Hinckley et al. | |

FOREIGN PATENT DOCUMENTS

| | | | |
|---|---|---|---|
| EP | 0930948 | B1 | 7/1999 |
| EP | 1676823 | A1 | 7/2006 |
| WO | 9641068 | A1 | 12/1996 |
| WO | 9831467 | A1 | 7/1998 |

* cited by examiner

APPARATUS AND METHOD TO REDUCE WEAR AND FRICTION BETWEEN CMC-TO-METAL ATTACHMENT AND INTERFACE

STATEMENT REGARDING FEDERALLY SPONSORED RESEARCH OR DEVELOPMENT

This invention was made with government support under Contract No. DE-FC26-05NT42643. The United States government may have certain rights to the invention.

FIELD OF THE INVENTION

The present invention relates generally to ceramic matrix composite (CMC) components attaching and interfacing with metal components, and more particularly, to ceramic matrix composite turbine engine components attaching and interfacing with metal components and using a metal layer, such as a metal layer positioned between the ceramic matrix composite turbine engine components and interfacing metal components to reduce wear and friction between the components during operation at elevated temperatures.

BACKGROUND OF THE INVENTION

Ceramic matrix composites (CMC) are often used in applications requiring high strength in elevated temperature environments, such as turbine engine components, including turbine blades.

Generally, such turbine components require attachment to adjoining metallic hardware and/or metallic surfaces, sometimes referred to as disks. Among disadvantages associated with attaching a CMC to metallic hardware is the wear of the metallic hardware by the hard, abrasive ceramic material surface. Under high contact stresses, damage to the ceramic material surface is also possible, usually due to matrix cracking and fiber breakage that lead to the formation of wear troughs.

In response, U.S. Publication No. US2010/0284816 discloses a method for creating a fir tree dovetail attachment for a CMC airfoil using a secondary metallic member with multiple contact surfaces. The metallic member is intended to trap the CMC and transfer the airfoil loading into the metallic member which has features/bearing surfaces similar to a multi-tooth fir tree attachment. These surfaces are designed for load transfer and not to reduce friction or wear at the disk attachment interface. Design against wear is not discussed.

U.S. Pat. No. 5,466,979 discloses use of a vibration source with a tailored frequency to help remove debris particles that build-up on the contact surface in an effort to lessen wear rates.

EP Publication No. 0 352 476 discloses incorporating a circumferential internal wear pocket and radial slots, but for purposes of reducing forced excitation due to fluid flow.

What is needed is an apparatus and method for reducing wear between CMC-to-metal surfaces during operation at elevated temperatures.

SUMMARY OF THE INVENTION

Improvements in manufacturing technology and materials are the keys to increased performance and reduced costs for many articles and apparatus. As an example, continuing and often interrelated improvements in processes and materials have resulted in major increases in the performance of gas turbine engines, such as the improvements of the present invention. In one embodiment, the present invention is directed to an apparatus and method for manufacturing a component made from a ceramic matrix composite (CMC), in which CMC-to-metal attachment and interface occurs at elevated temperatures. Insertion of a compliant metal layer having a low coefficient of friction between the attachment contacting surfaces of the CMC and a metal component reduces wear along the CMC-to-metal attachment.

The terms interface surface, interfacing surface and the like are intended to include contacting surfaces as well as attaching or interlocking surfaces.

The present invention is directed to an apparatus to reduce wear and friction between CMC-to-metal attachment and interface, including a metal layer configured for insertion between a surface interface between a CMC component and a metal component. The surface interface of the metal layer is compliant relative to asperities of the surface interface of the CMC component. A coefficient of friction between the surface interface of the CMC component and the metal component is about 1.0 or less at an operating temperature between about 300° C. to about 325° C. and a limiting temperature of the metal component.

The present invention is further directed to an apparatus for use in a heated environment including a CMC component. A metal component has a surface interface with the CMC component. A metal layer is configured for insertion between the surface interface between the CMC component and the metal component. The surface interface of the metal layer is compliant relative to asperities of the surface interface of the CMC component. A coefficient of friction between the surface interface of the CMC component and the metal component is about 1.0 or less at an operating temperature between about 300° C. to about 325° C. and a limiting temperature of the metal component.

The present invention is also directed to a method to reduce wear and friction between CMC-to-metal attachment and interface. The method includes providing a metal layer configured for insertion between a surface interface between a CMC component and a metal component. The surface interface of the metal layer is compliant relative to asperities of the surface interface of the CMC component. A coefficient of friction between the surface interface of the CMC component and the metal component is about 1.0 or less at an operating temperature between about 300° C. to about 325° C. and a limiting temperature of the metal component. The method includes inserting the layer between the surface interface between the CMC component and the metal component.

The method further includes operating the CMC component, the layer and the metal component at the operating temperature.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
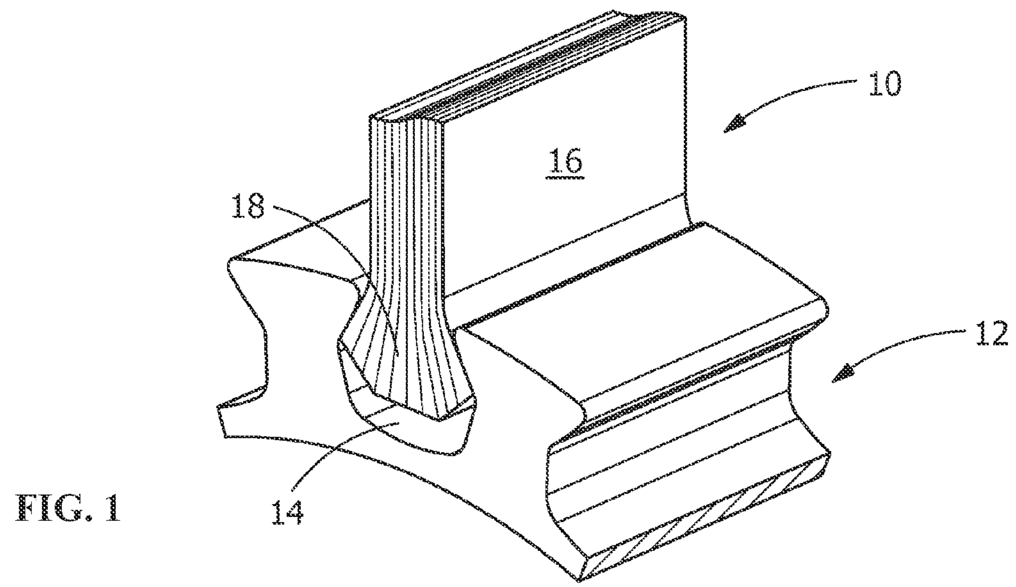
FIG. 1 is an exemplary partial sectional perspective view of a composite blade of the present invention assembled in a dovetail slot of a gas turbine engine rotor.

FIG. 1 depicts an exemplary gas turbine engine blade 10. In this illustration, a turbine blade 10 is constructed of a ceramic matrix composite (CMC) material. Turbine blade 10 is mounted to a turbine disk 12 in a dovetail slot 14. Turbine blade 10 includes an airfoil 16, against which a flow of hot exhaust gas is directed, and a dovetail 18, also referred as a root or splayed base, that extends from airfoil 16 and engages dovetail slot 14.

Figure 2:
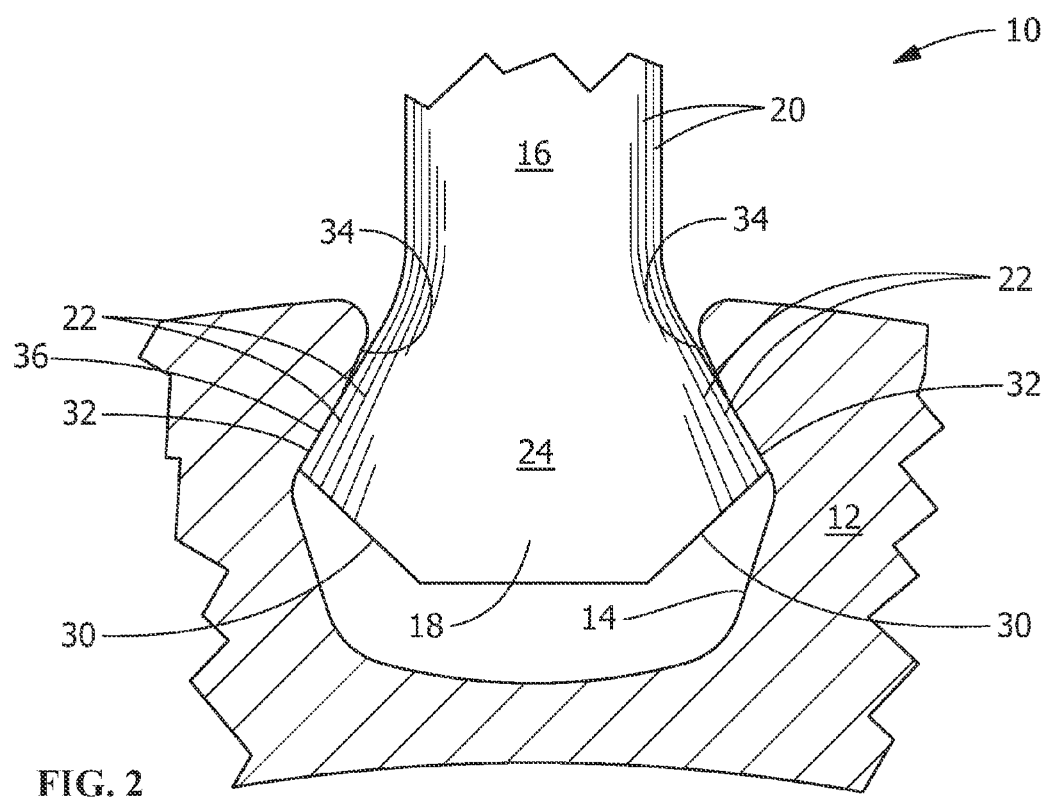
FIG. 2 is a partial sectional view of the blade and rotor of FIG. 1 of the present invention.

Referring now to FIG. 2, which is an example of an enlarged sectional view of a CMC blade 10, such as comprised of silicon carbide reinforcement fibers in a silicon carbide matrix, and disk 12, such as comprised of a metal, such as a nickel alloy, the contacting or interfacing surfaces thereon are described in greater detail. The blade 10 includes a plurality of plies, 20 and 22, which have been bonded together, such as by processes well known in the art. Plies 22 are bonded to a root core 24. The lower end of blade 10 is defined in part by an end surface 30 and a root surface 32. Dovetail slot 14 of disk 12 is defined by a mating surface 34. A collective pair of interface or interfacing surfaces 36 are formed between opposed corresponding root surfaces 32 and mating surfaces 34. Wear between root surfaces 32 of CMC blade 10 and mating surfaces 34 of disk 12 occur as a result of abrasive contact due to asperities inherent in processing CMC blade 10, in combination with radially directed sliding contact between root surfaces 32 of CMC blade 10 and mating surfaces 34 of disk 12, due to centrifugal forces generated during the high-speed rotational movement of the gas turbine engine during its operation. Superimposed, is the micro-motion due to airfoil high-frequency vibration which results in what is commonly known as fretting wear.

Although an exemplary embodiment of CMC is comprised of silicon carbide, technical ceramics such as alumina, aluminum nitride, silicon nitride or zirconia may also be used. Other available CMCs can include, for example, C/C, C/SiC, SiC/SiC and $Al_2O_3/Al_2O_3$. CMC materials composed of Carbon (C), special silicon carbide (SiC), alumina ($Al_2O_3$) and mullite ($Al_2O_3$—$SiO_2$) fibers are most commonly used for CMCs. The matrix materials are usually the same; that is C, SiC, alumina and mullite).

Figure 3:
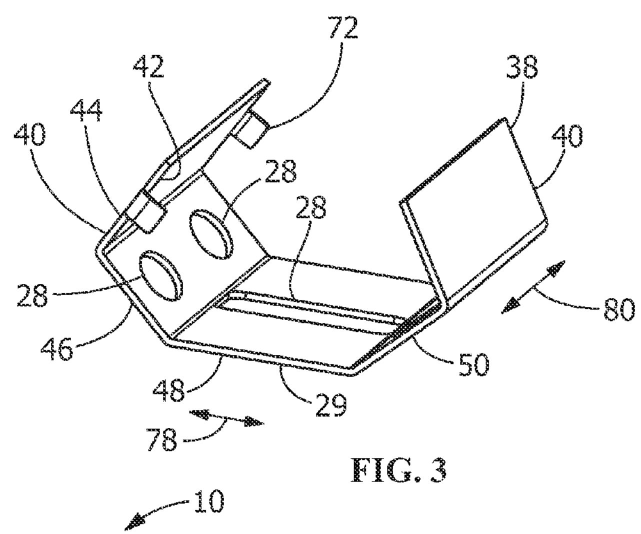
FIGS. 3 and 4 are respective perspective and end views of an exemplary interfacing layer of the present invention.
Figure 4:
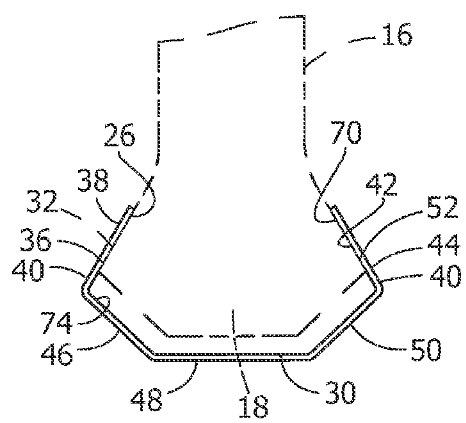

FIGS. 3 and 4 illustrate respective perspective and end views of an interface or interfacing layer 38 for insertion between CMC blade 10 and disk 12 (FIG. 2). Interface or interfacing layer 38 includes an inner surface 42 and an outer surface 44 and layer portions 46, 48, 50 positioned between opposite layer portions 40. In one embodiment, layer portions 46, 48, 50 may have optional openings 28 formed therein, such as for weight savings, so long as layer portions 46, 48, 50 maintain a predetermined spacing of opposed layer portions 40 relative to one another. That is, opposed layer portions 40 are contiguously interconnected by other layer portions, however configured, to form a unitary or one-piece construction. In one embodiment, the one-piece construction is symmetrical. Stated differently, the interface layer has opposed layer portions 40 that are symmetric, such as about a center line of an airfoil, which airfoil having symmetric interfacing surfaces about a center axis of the airfoil, such as interfacing surfaces 36 (FIG. 2) that contact corresponding layer portions 40. Applicants have determined that a one-piece construction of interface layer 38, and notably a one-piece interface layer having a symmetrical construction provides improved stiffness. Such stiffness resists small amounts of motion, sometimes referred to as micro-motion, that can occur due to vibration. Separate interface surfaces, such as associated with separate shims (i.e., one shim per interface surface 36 (FIG. 2)) has been shown to be especially susceptible to micro-motion, which micro-motion being capable of accelerating wear between the interface surfaces 36, 42 As shown, layer portions 40 are In another embodiment, layer portions 46, 48, 50 may resemble bands 29, e.g., layer portion 48 and FIG. 3, collectively extending in a direction 78 substantially transverse to an axial direction 80 between opposed layer portions 40. Respective inner surfaces 42 of layer portions 40 of interfacing layer 38 form a collective interfacing surface 52 with root surface 32 of turbine blade 10. Interfacing layer 38 is axially slid over dovetail or root 18 of turbine blade 10 and restrained radially using either a mechanical interlock, such as tab 72 or a secondary bond 74, such as an adhesive layer or chemical bond. In one embodiment, interfacing layer 38 is sufficiently radially restrained to substantially prevent relative radial movement along interfacing surface 52 between inner surface 42 of layer portions 40 of interfacing layer 38 and corresponding root surfaces 32 of turbine blade 10. In another embodiment, interfacing layer 38 is sufficiently radially restrained to reduce relative radial movement along interfacing surface 52 between inner surface 42 of layer portions 40 of interfacing layer 38 and corresponding root surfaces 32 of turbine blade 10.

Figure 5:
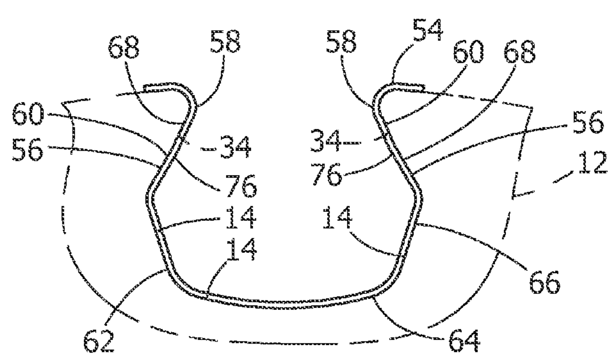
FIG. 5 is an end view of an exemplary interfacing layer of the present invention.

In an alternate embodiment, FIG. 5 illustrates an end view of an interfacing layer 54 for insertion between CMC blade 10 (FIG. 2) and disk 12. Interfacing layer 54 includes an inner surface 58 and an outer surface 60 and layer portions 62, 64, 66 positioned between opposite layer portions 56. In one embodiment, layer portions 62, 64, 66 may have optional openings (not shown) formed therein such as previously discussed for layer portions 46, 48, 50 of interfacing layer 38 (FIG. 3), such as for weight savings, so long as layer portions 62, 64, 66 maintain a predetermined spacing of opposed layer portions 56 relative to one another. In another embodiment, layer portions 62, 64, 66 may resemble bands (not shown) such as previously discussed and shown for layer portion 48 of interfacing layer 38 (FIG. 3), collectively extending in a direction substantially transverse to an axial direction between opposed layer portions 56. Respective outer surfaces 60 of layer portions 56 of interfacing layer 54 form a collective interfacing surface 68 with mating surfaces 34 of disk 12. Respective inner surfaces 58 of layer portions 56 of interfacing layer 54 form a collective interfacing surface 76 with root surfaces 32 of turbine blade 10 (FIG. 2). Interfacing layer 54 is axially slid over root or dovetail slot 14 of disk 12 and restrained radially using either a mechanical interlock (e.g., similar to tab 72 in FIG. 3) or a secondary bond (not shown). In one embodiment, interfacing layer 54 is sufficiently radially restrained to substantially prevent relative radial movement along interfacing surface 68 between outer surface 60 of layer portions 56 of interfacing layer 54 and corresponding mating surfaces 34 of disk 12. In another embodiment, interfacing layer 54 is sufficiently radially restrained to reduce relative radial movement along interfacing surface 76 between inner surface 58 of layer portions 56 of interfacing layer 54 and corresponding root surfaces 32 of turbine blade 10. Optionally, a layer 26 of a dry film lubricant of about 0.02 mm to about 0.03 mm may be applied along interfacing surface 76. Layer 26 of dry film lubricant may include Tungsten disulfide, Graphite-based lubricants, Molybdenum disulfide, or any suitable combinations thereof In one embodiment, interfacing layer 38, 54 is between about 0.08 mm and about 0.25 mm, between about 0.10 mm and about 0.20 mm, between about 0.10 mm and about 0.15 mm, between about 0.13 mm and about 0.15 mm, or any suitable range or sub-range thereof. In one embodiment, interfacing layer 38, 54 is about 0.08 mm, about 0.10 mm, about 0.13 mm, about 0.15 mm, about 0.18 mm, about 0.20 mm, about 0.23 mm, about 0.25 mm, or any suitable sub-range thereof.

Interfacing layer 38, 54 is composed of a ductile or compliant material as compared to a CMC in order to cover the asperities inherent in processed CMC components. In addition, interfacing layer 38, 54 is thin, as discussed above, which reduces the effect associated with a reduction of load carrying capacity of the blade attachment for supporting disk lugs of interfacing layer 38, 54 as a result of its geometry. That is, at least partly as a result of interfacing layer 38, 54 being thin, being better matched for tribology with a metal disk, being in intimate contact with and/or attached or otherwise providing an interface between the CMC or the disk as discussed above, a reduced coefficient of friction is achieved.

Interfacing layer 38, 54 may be composed of ductile alloys configured for use at a service temperature, or an ambient temperature of the components during operation, while providing a coefficient of friction of 1.0 or less, to prevent fretting, due to vibratory motion or as corrosion. For example, for a gas turbine engine, the service temperature is typically between about 300° C. to about 325° C. and a limiting temperature of the disk, e.g., disk-grade steel alloys, or a Nickel-based alloy having about a 760° C. limiting temperature, although use of other disk materials could be greater than 760° C. The term limiting temperature is intended to refer to a maximum temperature at which a component may be used. Exemplary compositions of interfacing layer 38, 54 include, but are not limited to ferrous alloys, especially high Chromium steels, Nickel-based alloys, such as Alloy 706, Alloy 718, Alloy 625, etc., and Cobalt-based alloys. In one embodiment, depending upon the types of metal utilized, the coefficient of friction is between about 1.0 and 0.4, between about 0.9 and 0.5, between about 0.8 and 0.6, between about 0.7 and 0.6, or any suitable range or sub-range thereof. In one embodiment, the coefficient of friction is about 1.0, about 0.9, about 0.8, about 0.7, about 0.6, about 0.5, about 0.4, or any suitable range or sub-range thereof.

Figure 6:
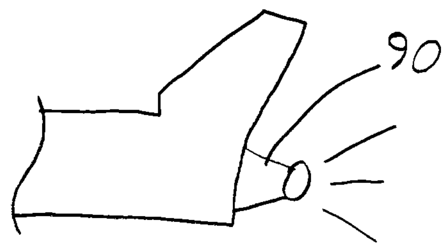
FIG. 6 is a partial sectional view of a shroud of the present invention.
Figure 7:
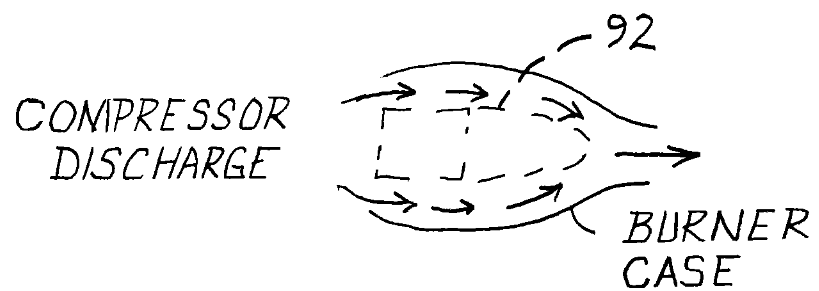
FIG. 7 is a partial sectional view of a combustion liner of the present invention.

It is to be understood that the interfacing layer 38, 54 as described herein, may also be applied to attachment locations for ceramic composites such as shrouds 90 (FIG. 6) or combustion liners 92 (FIG. 7), or any other appropriate location that would benefit from a compliant layer with the benefits described herein. Additionally, the wear surfaces can in addition to contact surfaces between different components, also include lining apertures used for structural fasteners.

Figure 8:
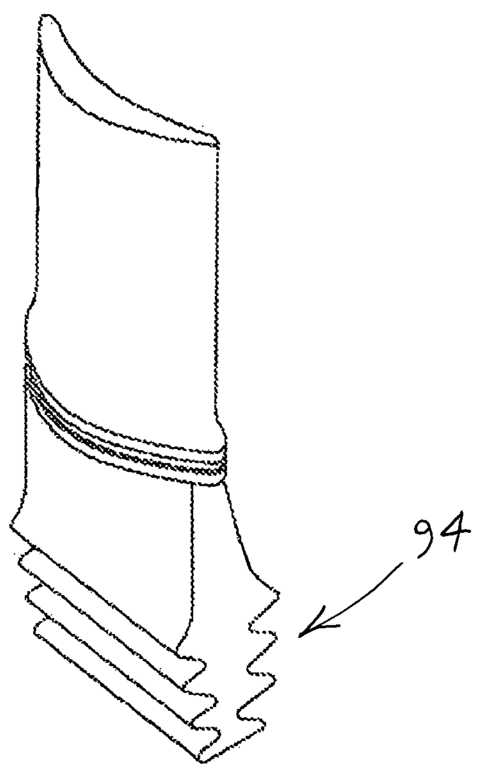
FIG. 8 is an exemplary perspective view of an interface layer having a fir tree arrangement.

It is to be understood that the interfacing layer of the present invention includes arrangements, such as a root or dovetail having a "fir tree" (hereinafter fir tree) arrangement 94 (FIG. 8), or multiple interfacing surfaces between the root or dovetail surfaces and the disk slot surfaces, as is well known.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus to reduce wear and friction between CMC-to-metal attachment and interface, comprising:

a homogenous, one-piece single metal layer capable of being devoid of openings configured for insertion between multiple interfacing surfaces between a CMC component and a metal component, the metal layer formed separately from the CMC component and the metal component;

wherein only the metal layer is inserted between the CMC component and the metal component;

wherein the interfacing surfaces of the metal layer are compliant relative to asperities of the interfacing surfaces of the CMC component, a coefficient of friction between the interfacing surfaces of the CMC component and the metal component being above 0 and less than or equal to 0.4 at an operating temperature between about 300° C. to about 325° C. and a limiting temperature of the metal component of up to 760° C.;

wherein the multiple interfacing surfaces of the CMC component define a fir tree arrangement.

2. The apparatus of claim 1, wherein at least one of fibers and matrix of the CMC is silicon carbide.

3. The apparatus of claim 1, wherein the metal layer is between about 0.08 mm and about 0.25 mm.

4. The apparatus of claim 1, wherein the metal layer is between about 0.10 mm and about 0.20 mm.

5. The apparatus of claim 1, wherein the metal layer is between about 0.13 mm and about 0.15 mm.

6. The apparatus of claim 1, wherein the metal layer is about 0.15 mm.

7. The apparatus of claim 1, wherein the metal layer is selected from the group consisting of ferrous alloys, Nickel-based alloys, and Cobalt-based alloys.

8. An apparatus for use in a heated environment comprising:

a CMC component;

a metal component having multiple interfacing surfaces with the CMC component, the multiple interfacing surfaces of the CMC component defining a fir tree arrangement; and a homogenous, one-piece single metal layer capable of being devoid of openings, the metal layer having opposed interconnected layer portions configured for insertion between corresponding portions of the multiple interfacing surfaces between the CMC component and the metal component, the metal layer formed separately from the CMC component and the metal component;

wherein only the metal layer is inserted between the CMC component and the metal component;

wherein the opposed interconnected layer portions of the multiple interfacing surfaces of the metal layer are compliant relative to asperities of corresponding layer portions of the multiple interfacing surfaces of the CMC component, a coefficient of friction between the corresponding layer portions of the multiple interfacing surfaces of the CMC component and the metal component after insertion of the corresponding layer portions of the metal layer being above 0 and less than or equal to 0.4 at an operating temperature between about 300° C. to about 325° C. and a limiting temperature of up to 760° C.

9. The apparatus of claim 8, wherein the metal layer is between about 0.08 mm and about 0.25 mm.

10. The apparatus of claim 8, wherein the metal layer is between about 0.10 mm and about 0.20 mm.

11. The apparatus of claim 8, wherein the metal layer is between about 0.13 mm and about 0.15 mm.

12. The apparatus of claim 8, wherein the metal layer is selected from the group consisting of ferrous alloys, Nickel-based alloys, and Cobalt-based alloys.

13. The apparatus of claim 8, wherein the component is a turbine engine component.

14. The apparatus of claim 8, wherein the component is a turbine blade.

15. A method to reduce wear and friction between CMC-to-metal attachment and interface, comprising:

configuring a homogenous, one-piece single metal layer capable of being devoid of openings, the metal layer having opposed interconnected layer portions for insertion between corresponding portions of multiple interfacing surfaces between a CMC component and a metal component, the metal layer formed separately from the CMC component and the metal component, the multiple interfacing surfaces of the CMC component defining a fir tree arrangement, wherein only the metal layer is inserted between the CMC component and the metal component, the corresponding portions of the multiple interfacing surfaces of the corresponding portions of the metal layer being compliant relative to asperities of the corresponding portions of the multiple interfacing surfaces of the CMC component, a coefficient of friction between the corresponding portions of the multiple interfacing surfaces of the CMC component and the metal component being above 0 and less than or equal to 0.4 at an operating temperature between about 300° C. to about 325° C. and a limiting temperature of the metal component; and inserting the layer portions of the metal bar between the corresponding layer portions of the multiple interfacing surfaces between the CMC component and the metal component of up to 760° C.; and operating the CMC component, the metal layer and the metal component at the operating temperature.

* * * * *